Dec. 21, 1965    O. C. BLOMGREN, SR., ETAL    3,224,497
METHOD AND APPARATUS FOR LOWERING THE
TEMPERATURE OF A HEATED BODY
Filed March 26, 1963    3 Sheets-Sheet 1
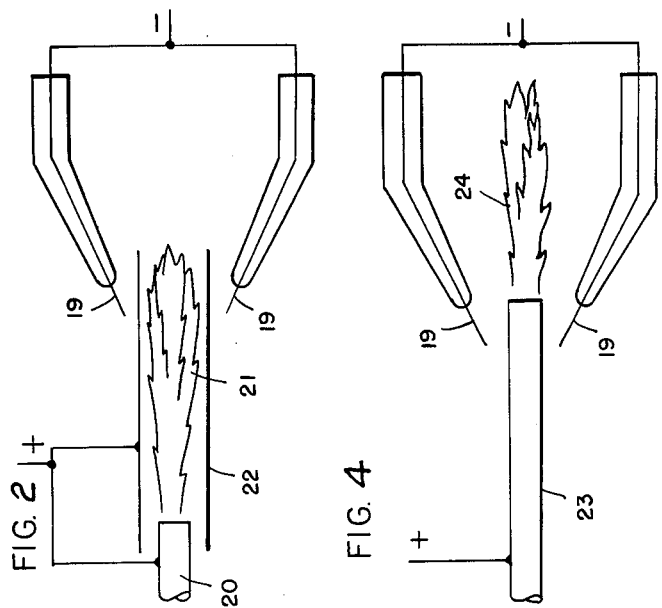
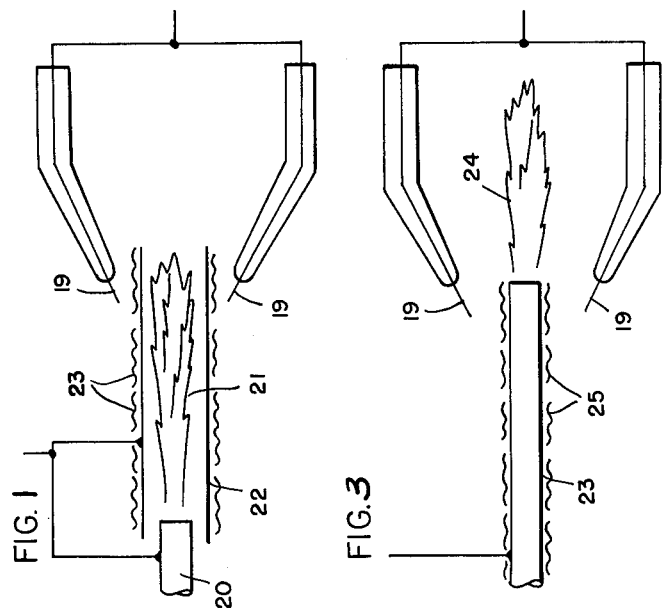
INVENTORS:
OSCAR C. BLOMGREN, SR.
ELLSWORTH G. MUNCK
SPENCER R. GRIFFITHS, JR.
OSCAR C. BLOMGREN, JR.
BY
*Mazall, Johnston, Cook + Root*
ATT'YS

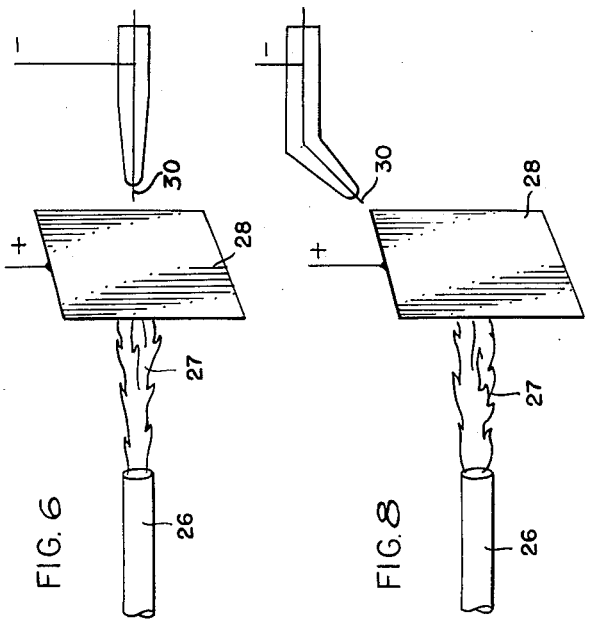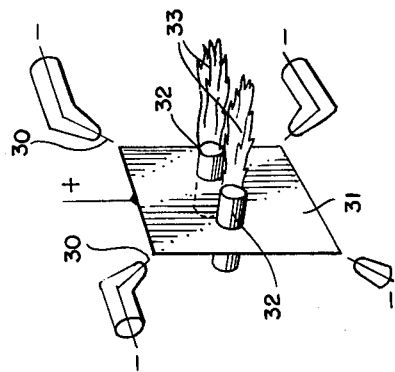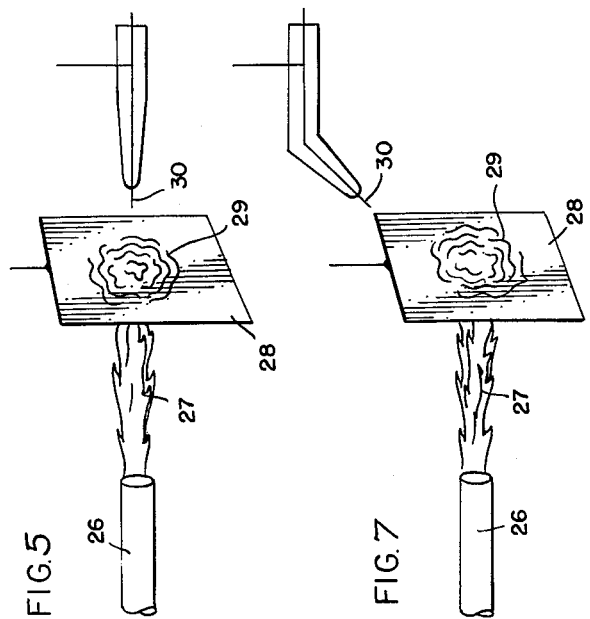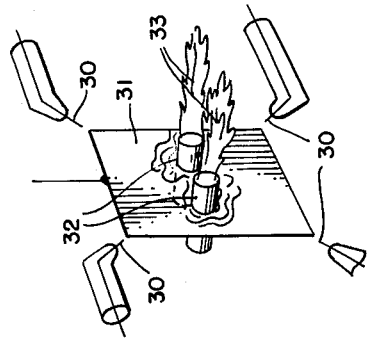

Dec. 21, 1965   O. C. BLOMGREN, SR., ETAL   3,224,497
METHOD AND APPARATUS FOR LOWERING THE
TEMPERATURE OF A HEATED BODY
Filed March 26, 1963                         3 Sheets-Sheet 3

INVENTORS:
OSCAR C. BLOMGREN, SR.
ELLSWORTH G. MUNCK
SPENCER R. GRIFFITHS, JR.
OSCAR C. BLOMGREN, JR.
BY
*Merrill, Johnston, Cook & Root*
ATT'YS 3,224,497
METHOD AND APPARATUS FOR LOWERING THE TEMPERATURE OF A HEATED BODY
Oscar C. Blomgren, Sr., Lake Bluff, Ill., Ellsworth G. Munck, Cleveland, Ohio, and Spencer R. Griffiths, Jr., Park Ridge, and Oscar C. Blomgren, Jr., Lake Bluff, Ill., assignors to Inter-Probe, Inc., North Chicago, Ill., a corporation of Illinois
Filed Mar. 26, 1963, Ser. No. 268,185
10 Claims. (Cl. 165—2)

This invention relates in general to a method and apparatus for controlling energy level in matter, and more particularly to a method and apparatus capable of lowering the temperature of an electrically or flame heated body. Still more particularly, the present invention involves the use of a high voltage, low amperage, direct current source.

The method of the present invention comprises the directing of a source of direct current voltage towards heated matter for controlling its temperature and energy level. Another example relates to the cooling of a heated matter by directing thereagainst a negatively charged electrode or probe. Preferably, the electrode or probe is supplied with a high voltage, low amperage power supply. While not necessary, the positive side of the power supply may be connected to the flame, or heated matter, wherein somewhat better efficiency is experienced. Whether the heated matter is flame, electrically, or otherwise heated is immaterial, as the method of the present invention works just as well in each case. The apparatus employed for carrying out the method comprises means for supplying a high voltage, low amperage direct current source and an electrode or probe negatively charged by connection to the negative side of the direct current source. Any suitable transformer or generator may be employed for supplying the direct current source.

It is therefore an object of the present invention to provide a method for controlling the energy level in matter.

It is a further object of the present invention to provide an apparatus for controlling the energy level in matter, wherein the apparatus includes a source of direct current voltage having its negative side connected to an electrode or probe arranged in spaced relation from the matter.

Still another object of the present invention is in the provision of a method and apparatus for lowering the temperature of a body that has been electrically, flame, or otherwise heated.

A further object of the present invention is to provide a method and apparatus for substantially reducing the energy level in heat subjected matter.

Another object of the present invention is to provide a method and apparatus for lowering the temperature of a body that has been heated by flame, electricity, friction, radiation, or chemical action.

Other objects, features and advantages of the invention will be apparent from the following detailed disclosure, taken in conjunction with the accompanying sheets of drawings, wherein like reference numerals refer to like parts, in which:

FIGS. 1 and 2 show diagrammatically the control of a flame generated energy level in a tube by application of the present invention;

FIGS. 3 and 4 show diagrammatically the control of energy level in the nozzle of a burning torch;

FIGS. 5 and 6 show diagrammatically the control of energy level in a sheet of material having a constant source of heat being applied on one side by application of the present invention, and wherein the electrode or probe is directed against one face of the sheet;

FIGS. 7 and 8 show diagrammatically the control of energy level in a sheet of material having a flame playing against one side of the sheet by application of the present invention, wherein the probe or electrode is directed against the edge of the sheet;

FIGS. 9 and 10 show diagrammatically the control of energy level in torch nozzles and a flange surrounding the nozzles by application of the present invention;

Figure 12:
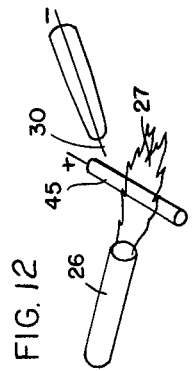
FIGS. 11 and 12 show diagrammatically the control of energy level in a flame enveloped rod by application of the present invention.

The present invention relates to the control of energy level in matter, and may be applied to control the energy level in matter caused by flame, electricity, friction, radiation, chemical action and the like. A few of the many specific applications are shown in the drawings and will be described hereinafter, but it should be appreciated that the present invention does have many other applications. Primarily, the present invention is useful in substantially decreasing the energy level in matter. Particularly, the present invention is useful in reducing the energy level in matter, which level has been raised by any known or unknown means.

In general, the method of controlling the energy level in matter in accordance with the present invention comprises the step of directing an electrostatic discharge of direct current voltage at the matter of which the energy level is to be controlled. Particularly, the high voltage, low amperage source of direct current is employed, and the directing means (probe or electrode) is spaced from the matter such a distance as to keep it outside of the shorting or arcing range.

The examples shown in FIGS. 1 and 2, 3 and 4, 5 and 6, 7 and 8, 9 and 10, and 11 and 12 illustrate the cooling and decreasing in energy level of an electrically conductive body that has been heated by means of a gas flame or the equivalent.

Referring particularly to the example of FIGS. 1 and 2, a gas torch 20 generating a flame 21 within a tube 22 of electrically conductive material heats the tube to define a glow condition as illustrated by the wavy lines 23 as shown in FIG. 1. Both the tube 22 and the torch 20 are electrically connected and in turn connected to the positive terminal of the transformer. A pair of probes or electrodes 19 are electrically connected together and connected to the negative terminal of the transformer and in turn arranged outside of the tube 22 in angular relationship thereto. Application of high voltage, low amperage power to the probes 19 effects a cooling or lowering of energy level in the tube in a short period of time as shown in FIG. 10 even though the flame 21 from the torch 20 continues to function. Thus, cooling of the tube 22 which may be of metal by employment of electrical energy in the manner shown can be efficiently accomplished.

Referring now to FIGS. 3 and 4, another example of cooling action is shown wherein a torch 23 emitting a flame 24 heats up and begin to glow as indicated by the wavy lines 25 in FIG. 3. The torch is electrically connected to the positive terminal of the transformer while probes 19 are connected to the negative terminal of the transformer and positioned relative to the torch 23 in the same manner that the probes 19 are positioned relative to the tube 22 in FIGS. 1 and 2. Energization of the transformer subjects the tube 22 to the action of an electrostatic discharge in a force field of direct current which removes substantially if not all of the heat from the torch 23 as illustrated in FIG. 4, while not effecting in any manner the flame 24.

Another example of the present invention is shown in FIGS. 5 and 6, wherein a torch 26 emitting a gas flame 27 is directed perpendicularly against one side of a sheet 28 of electrically conductive material, such as metal, to thereby define a red spot or glow 29 in the center area of the sheet as shown in FIG. 5. The sheet is connected to the positive terminal of the transformer while a probe 30 is connected to the negative terminal of the transformer which is pointed directly at the hot spot 29 and extends perpendicular to the sheet 28 as shown in the drawings. Energization of the transformer subjects the sheet 28 to a continuous electrostatic discharge and cools the sheet 28 by completely removing the glowing hot spot 29 even though the flame 27 of the torch 26 continues to play on the opposite side of the sheet as shown in FIG. 6.

FIGS. 7 and 8 illustrate an example similar to that of FIGS. 5 and 6, but differ therein in that the probe 30 is arranged to extend parallel to the sheet 28 and in alignment with an edge of the sheet but spaced therefrom. Again the action of the electrostatic discharge from the probe 30 completely removes the hot glowing spot in the center area of the sheet 28 thereby cooling same as illustrated in FIG. 8.

In FIGS. 9 and 10, another example of application of the present invention is shown wherein a sheet of electrically conductive material designated by the numeral 31 is provided with a pair of torches 32 extending therethrough and perpendicular thereto. The sheet 31 essentially constitutes a flange on the torches 32. The torches are also of electrically conductive material such as metal and heat up along with the immediately surrounding area of the sheet 31 to a glowing heat as shown in FIG. 9. Flames 33 are emitted from the torches 32. A plurality of probes 30 are arranged laterally of the edge of the sheet 31 in spaced relation thereto and electrically connected together and to the negative terminal of the transformer. The sheet 31 is connected to the positive terminal of the transformer. Energization of the transformer powered electrostatic discharge from the probes 30 immediately cools the torches 32 and the surrounding areas of the sheet 31 as shown in FIG. 18 even though the flames 33 continue. The torch operation is not affected by the action of the electrostatic discharge.

Figure 11:
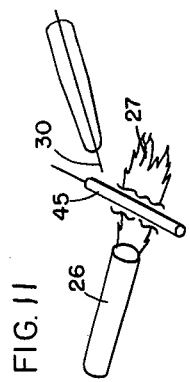

Another example is shown in FIGS. 11 and 12 wherein the torch 26 emitting a flame 27 heats a rod 45 of metal or other material until the energy level is raised so that the rod glows as shown in FIG. 11. Subjecting the rod to the action of an electrostatic discharge from the probe 30 immediately reduces the energy level of the rod to a point below which the rod no longer glows even though the flame 27 continues to envelope the rod as shown in FIG. 12.

The examples of FIGS. 13 and 14, and 15 and 16 illustrate the application of the present invention to cool an electrically heated element by employing the high voltage, low amperage circuit of the present invention.

Figure 14:
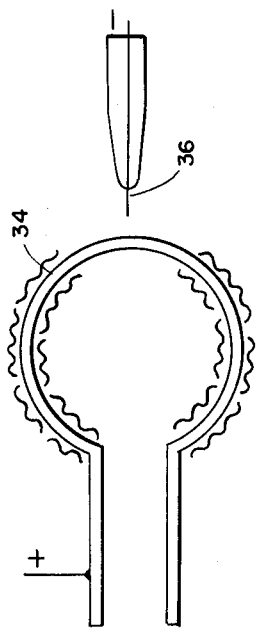
FIGS. 13 and 14 show diagrammatically the control of energy level in an electrically heated element by application of the present invention.
Figure 13:
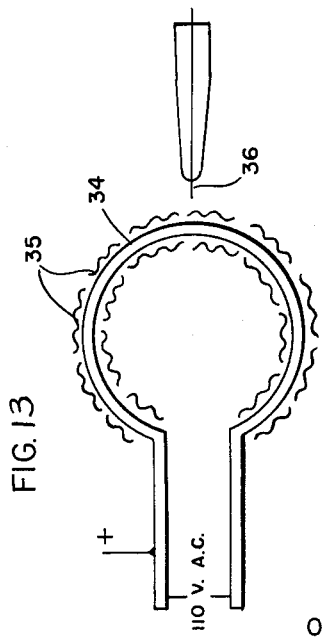

Referring particularly to FIGS. 13 and 14, an electrically conductive heating element 34, such as a Calrod element, is heated by a source of electrical energy such as when connected to a 110 volt A.C. or D.C. source. Upon reaching a certain temperature, the element begins to glow as illustrated by the wavy lines 35 in FIG. 13. In applying the present invention, the heating element 34 is connected to the positive terminal of the high voltage transformer, while a probe or electrode 36 is connected to the negative terminal of the transformer and directed towards any area along the heating element but in spaced relation therefrom. Completion of the electrical circuit of the transformer thereby immediately cools a portion of the heating element 34 in close proximity to the probe 36 as illustrated by the absence of wavy lines in the adjacent area as shown in FIG. 14.

Figure 16:
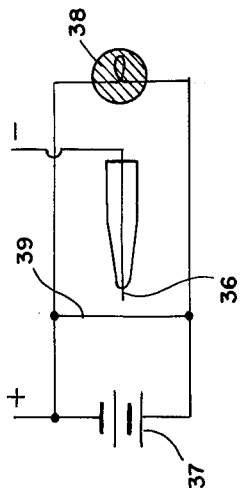
FIGS. 15 and 16 show diagrammatically the control of energy level in a shorting wire of an electrical circuit by application of the present invention, wherein controlling of the energy level has no effect on a lamp in the circuit.
Figure 15:
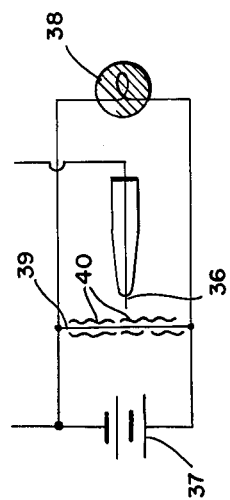

FIGS. 15 and 16 illustrate an electrical lamp circuit wherein a battery 37 provides direct current to a lamp 38. Normally the lamp will glow except when applying a short or shunt wire 39 across the battery and lamp which has a substantially lower resistance than the lamp. This causes the lamp to go out and allows the shorting wire 39 to be heated by the battery 37 to a glowing temperature as indicated by the wavy lines 40 in FIG. 15. In applying the present invention, the lamp circuit is connected to the positive terminal of the transformer while the probe 36 is arranged in spaced relation from the shorting wire 39. Energization of the electrostatic discharge from the probe 36 causes immediate cooling of the shorting wire 39 as shown in FIG. 16, but does not have any effect on the operation of the lamp 38 which still remains out.

In all applications of the present invention, it is not necessary to electrically connect the positive side of the power supply to the heated body and/or the heating element, but such is desirable to increase the efficiency of the electrostatic discharge action of the probe. Any number of probes can be employed and powered from the same source depending upon the area of cooling action needed. The area of cooling action may be enlarged by adding probes. Any probe must be spaced from the body on which it is to subject the electrostatic discharge a distance at least great enough so as to prevent arcing or shorting between the probe and body. It has been found that the examples illustrated require applying approximately 20,000 volts D.C. to the probe, although this may be increased or decreased depending upon the amount of cooling or energy level control desired. The amperage requirements are very low, such as the low milliamp range, but this also may be varied depending on the control desired. Moreover, any suitable type of high voltage low current generator may be provided to produce the electrical energy used.

Various explanations have been advanced as to why the present invention is effective in controlling the energy level in matter. It is believed the continuous electrostatic discharge from a probe affects the energy level in heated matter by inhibiting and possibly stopping the electron movement of the matter thereby causing cooling thereof.

In view of the foregoing, it should be appreciated that the apparatus and method of the present invention serves to control energy level in electrically or flame heated materials, and to control flame flow direction of a torch or the like.

It will be understood that modifications and variations may be effected without departing from the scope of the novel concepts of the present invention, but it is understood that this application is to be limited only by the scope of the appended claims.

The invention is hereby claimed as follows:

1. The method of lowering the temperature of a solid body exposed to ambient atmosphere and heated to a temperature above said ambient atmosphere comprising the steps of directing a needle-like probe toward the exterior of said body, negatively charging said probe with a high voltage low-current source, and spacing said probe at a distance from said body slightly greater than that which would cause arcing between said probe and said body.

2. The method of lowering the temperature of an electrically conductive solid body exposed to ambient atmosphere and heated to a temperature above said ambient atmosphere comprising the steps of directing a needle-like probe toward the exterior of said body, negatively charging said probe with a high voltage low-current source, and spacing said probe at a distance from said body slightly greater than that which would cause arcing between said probe and said body.

3. The method of lowering the temperature of an electrically conductive solid body exposed to ambient atmosphere and heated to a temperature above said ambient atmosphere comprising the steps of directing a needle-like probe toward the exterior of said body, negatively charging said probe wtih a high voltage low-current source, spacing said probe at a distance from said body slightly greater than that which would cause arcing between said probe and said body, and positively charging said body.

4. The method of lowering the temperature of a tubular member exposed to ambient atmosphere having a high heat source therein for heating said member to a temperature above said ambient atmosphere, said method comprising the steps of directing a needle-like probe toward one side of said member, applying a negative high voltage low-current charge to said probe, and spacing said probe at a distance from said member slightly greater than that which would cause arcing between said probe and said member.

5. The method of lowering the temperature of a tubular member exposed to ambient atmosphere having a high heat source therein for heating said member to a temperature above said ambient atmosphere, said method comprising the steps of directing a needle-like probe toward one side of said member, applying a negative high voltage low-current charge to said probe, spacing said probe at a distance from said member slightly greater than that which would cause arcing between said probe and said member, and positively charging said member.

6. The method of lowering the temperature of a solid body exposed to ambient atmosphere and heated to a temperature above said ambient atmosphere comprising the steps of directing a plurality of needle-like probes toward the exterior of said body, negatively charging said probes with a high voltage low-current source, and spacing said probes at a distance from said body slightly greater than that which would cause arcing between said probes and said body.

7. The method of lowering the temperature of a sheet of material exposed to ambient atmosphere and heated above said ambient atmosphere comprising the steps of directing a needle-like probe toward said sheet, negatively charging said probe with a high voltage low-current source, and spacing said probe at a distance from said sheet slightly greater than that which would cause arcing between said probe and said sheet.

8. The method of lowering the temperature of an element exposed to ambient atmosphere and electrically heated above said ambient atmosphere comprising the steps of directing a needle-like probe toward said element, negatively charging said probe with a high voltage low-current source, and spacing said probe at a distance from said element slightly greater than that which would cause arcing between said probe and said element.

9. In combination with an article exposed to ambient atmosphere and a high heat source raising the temperature thereof above said ambient atmosphere, apparatus for lowering the temperature of the article comprising, means for providing a high voltage low-current source, a needle-like probe spaced from and directed towards said article, means connecting the negative side of said voltage means to said probe, and said probe being spaced a distance from the article slightly greater than that which would cause arcing between said probe and said article.

10. In combination with an article exposed to ambient atmosphere and a high heat source raising the temperature thereof above said ambient atmosphere, apparatus for lowering the temperature of the article comprising, means for providing a high voltage low-current source, a needle-like probe spaced from and directed towards said article, means connecting the negative side of said voltage means to said probe, said probe being spaced a distance from the article slightly greater than that which would cause arcing between said probe and said article, and means connecting the positive side of said voltage means to said article.

References Cited by the Examiner

UNITED STATES PATENTS

| | | | |
|---|---|---|---|
| 2,433,116 | 12/1947 | Greenbowe et al. | 117—93.4 X |
| 2,604,936 | 7/1952 | Kaehni et al. | |
| 2,605,377 | 7/1952 | Kaehni et al. | 165—1 X |
| 2,658,009 | 11/1953 | Ransburg. | |
| 3,125,457 | 3/1964 | Meister | 117—93.4 X |

OTHER REFERENCES

Publication: Pohl, R. W., Physical Principles of Electricity and Magnetism, London, Blackie & Sons, Ltd., 1933 (page 225 relied on).

JAMES W. WESTHAVER, *Primary Examiner.*